United States Patent [19]

Doany

[11] Patent Number: 5,644,432
[45] Date of Patent: Jul. 1, 1997

[54] THREE PRISM COLOR SEPARATOR

[75] Inventor: Fuad Elias Doany, Katonah, N.Y.

[73] Assignee: IBM Corporation, Armonk, N.Y.

[21] Appl. No.: 373,704

[22] Filed: Jan. 17, 1995

[51] Int. Cl.$^6$ ................................................. G02R 27/14
[52] U.S. Cl. ........................................... 359/634; 359/638
[58] Field of Search ..................................... 359/634, 638

[56] References Cited

U.S. PATENT DOCUMENTS

| | | | |
|---|---|---|---|
| 3,202,039 | 8/1965 | de Lang et al. | 348/265 |
| 3,602,637 | 8/1971 | Katsuta et al. | 348/338 |
| 4,035,836 | 7/1977 | Miyaji et al. | 358/55 |
| 4,916,529 | 4/1990 | Yamamoto et al. | 348/337 |
| 5,022,750 | 6/1991 | Flasck | 349/10 |
| 5,096,280 | 3/1992 | Hamada | 359/634 |
| 5,196,926 | 3/1993 | Lee | 348/751 |
| 5,206,674 | 4/1993 | Puech et al. | 353/122 |
| 5,251,068 | 10/1993 | Oshima et al. | 359/634 |
| 5,270,804 | 12/1993 | Lach | 348/751 |
| 5,438,453 | 8/1995 | Kuga | 359/636 |

FOREIGN PATENT DOCUMENTS

| | | |
|---|---|---|
| 0 435 288 A1 | 12/1990 | European Pat. Off. . |
| 0 606 162 A3 | 1/1994 | European Pat. Off. . |
| 63-39294 | 2/1988 | Japan . |

OTHER PUBLICATIONS

Japanese Abstract 61-177079, "Projection Type Television Receiver," Himuro, Aug. 8, 1986.

*Primary Examiner*—Georgia Y. Epps
*Assistant Examiner*—Thomas Robbins
*Attorney, Agent, or Firm*—Scully, Scott, Murphy and Presser

[57] ABSTRACT

A color separator using three joined prisms for color separation in projection displays. The configuration is compact, relatively simple to assemble, and eliminates a requirement for complicated optical components such as crossed dichroic beam splitters and large retrofocus projection lenses. The configuration is particularly advantageous for projectors based upon liquid crystal, reflective light valves or spatial light modulators (SLM). A first prism has a dichroic coating on an interface between the first and a second prism which reflects one primary color and transmits the other two primary colors. The light path through the first prism has a second reflection (total internal reflection) off the side of the first prism, and emerges normal to the third face of the first prism to a first SLM. The second prism has a dichroic coating at an interface of the second and a third prism which reflects one of the remaining two primary colors and transmits the third primary color. The second primary color is reflected toward the third face of the second prism and emerges normal to that surface to a second SLM. The third color passes through the third prism without any reflections and emerges normal to the surface of the third prism to a third SLM. The three prisms are optically contacted and cemented to one another at a first interface between the first and second prisms and at a second interface between the second and third prisms to form a single unit.

7 Claims, 1 Drawing Sheet

THREE PRISM COLOR SEPARATOR

BACKGROUND OF THE INVENTION

1. Field of the Invention

The present invention relates generally to a three prism color separator, and more particularly pertains to a color separator using three joined prisms for color separation in projection displays. The configuration is compact, relatively simple to assemble, and eliminates a requirement for complicated optical components such as crossed dichroic beam splitters and large retrofocus projection lenses. The configuration is particularly advantageous for projectors based upon liquid crystal, reflective light valves.

2. Discussion of the Prior Art

Projection displays based upon reflective liquid crystal light valves (spatial light modulators) generally comprise dichroic beam splitters necessary for color separation and a polarizing beam splitter necessary for light valve operation, which are positioned between the light valves and the projection lens.

In projection displays such as optical monitors, an image from an active device, such as a spatial light modulator, is projected onto a screen at a desired magnification. As the size of the active device is decreased, a reflecting spatial light modulator (SLM) is required to obtain good contrast from the system. For color images, images in three primary colors obtained from three spatial light modulators are simultaneously projected and superposed onto the screen. The optics used to generate color images in this manner typically comprise a dichroic beam splitter, which is a color separation/combining prism set configured as a crossed dichroic cube, and a polarizing beam splitting cube.

The color separation/combining prism set and the polarizing beam splitting cube are positioned between the projection lens and the spatial light modulators, and the optical path through this assembly winds up being at least 150 mm for a 35 mm×35 mm spatial light modulator, and may be as large as 200 mm depending upon the geometry of the optics.

In addition, the spatial light modulators work most efficiently with light being incident thereon at substantially normal incidence over a finite conical angle. The polarizing beam splitting cube must operate over the full visible spectrum and over this finite conical angle. This also constrains the projection lens to operate with light reflecting from the spatial light modulators in essentially a normal incidence mode, which amounts to having a projection lens which is designed for a telecentric mode on the SLM side and for a rather large working distance in glass.

Such projection lenses are quite expensive, and may not be very practical because the required asymmetry results in a significantly higher amount of residual lateral color, resulting from a lack of convergence of the three primary color images, which varies linearly with position in the field. Essentially, the three different wavelengths of the three primary colors have slightly different magnifications resulting in chromatic aberration and an imperfect overlap at the edges of the images.

In such prior art projection displays, the two main limitations on the optical quality of the display image are the projection lens and the crossed dichroic cube. The difficulty in the projection lens is in the required long working distance (retrofocus), which must be long enough to encompass the polarizing and color separation/recombination optics. The complexity of design and fabrication of the projection lens and the degradation of its optical performance increases with the length of the working distance.

The optical performance of the crossed dichroic cube must be very high quality for high resolution imaging. The crossed dichroic cube typically consists of four subcomponents assembled together in one cubic unit. Two of the three optical paths in this cube involve imaging the light valves through a split mirror without introducing aberrations. The optical and mechanical tolerances required for assembly of the four subcomponents make the cost of fabrication of the crossed dichroic cube prohibitive for many applications.

Although the crossed dichroic cube is very difficult and costly to manufacture, it provides the most compact optical configuration. Replacing the crossed dichroic cube with individual plate beam splitters or single-color beam splitter cubes only increases the working distance of the projection lens. The additional optics between the lens and the light valves makes the projection lens complicated and costly, and may degrade its performance. The requirement for a large working distance is a particular problem for relatively compact desk top displays since they require lenses with very short lens-to-screen distances.

A typical prior art camera prism assembly is difficult to manufacture as it requires three odd shaped prisms, with an air space being required between the first and second prisms. An air gap can introduce optical distortion, and in order to avoid optical distortion (astigmatism) in high resolution displays, the air space should be uniform and <10 μm.

SUMMARY OF THE INVENTION

Accordingly, it is a primary object of the present invention to provide a three prism color separator for projection displays.

A further object of the subject invention is the provision of a simplified three prism color separation/recombination optical system for high performance projection displays using three reflective light valves. The simple optical system of the present invention eliminates much complexity and cost associated with a crossed dichroic beam splitter cube and also with a longer retrofocus projection lens required for alternative color separation configurations.

In accordance with the teachings herein, the present invention provides an optical beam splitter in which a plurality of prisms form a color splitting prism assembly which directs a plurality of color components into a plurality of different directions. The plurality of prisms are assembled with no air gaps in each of the light paths corresponding to each of the color components, between where the light enters the color splitting prism assembly and where each of the color components exits the color splitting prism assembly.

In greater detail, an optical beam splitter directs a beam of light containing first, second, and third color components into first, second and third different directions. A first prism has a surface which reflects the first color in a first direction and transmits the second and third color components. A second prism has a surface which reflects the second color component in a second direction and transmits the third color in a third direction. The first, second and third prisms are assembled to form an integral assembly wherein the first, second and third colors do not pass through an air space within the color splitting prism assembly. Preferably, each of the first, second and third prisms comprise 30°–60°–90° prisms for separation and/or recombination of three colors of light, red, green and blue.

The optical beam splitter can be combined with a polarizing beam splitter cube in a projection display comprising reflective light valves such as liquid crystal light valves, or can be combined with a CCD camera.

In one embodiment, the three prisms are dissimilar prisms, with first, second and third optical paths, a first optical path without reflections, a second optical path with one reflection, and a third optical path with two reflections. The parity of the image is different in the three optical paths, with the first and the third optical paths having an even number of reflections, and the second optical path having an odd number of reflections. The difference in parity of the second optical path can be compensated for electronically by electronically reversing the sequence of information (pixels) in each line of scanning in the second optical path. Thus if the information (pixels) in the first and third optical paths is being scanned from left to right, the information (pixels) in the second optical path is reversed to scan from right to left, which results in a convergence of all three images.

In greater detail, the three prism color separator includes a first prism with a dichroic coating on an interface between the first and a second prism. The coating reflects one primary color and transmits the other two primary colors. The light path through the first prism has a second reflection (total internal reflection) off the side of the first prism, and emerges normal to the third face of the first prism to a first SLM. The second prism has a dichroic coating at an interface of the second and a third prism which reflects one of the remaining two primary colors and transmits the third primary color. The second primary color is reflected toward the third face of the second prism and emerges normal to that surface to a second SLM. The third color passes through the third prism without any reflections and emerges normal to the surface of the third prism to a third SLM. The three prisms are optically contacted and cemented to one another at a first interface between the first and second prisms and at a second interface between the second and third prisms to form a single integral prism unit. Three reflective SLM's are placed at the three light outputs normal to the three light paths, and the reflected light retraces itself through the prism assembly to recombine the three colors.

BRIEF DESCRIPTION OF THE DRAWINGS

The foregoing objects and advantages of the present invention for a three prism color separator may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
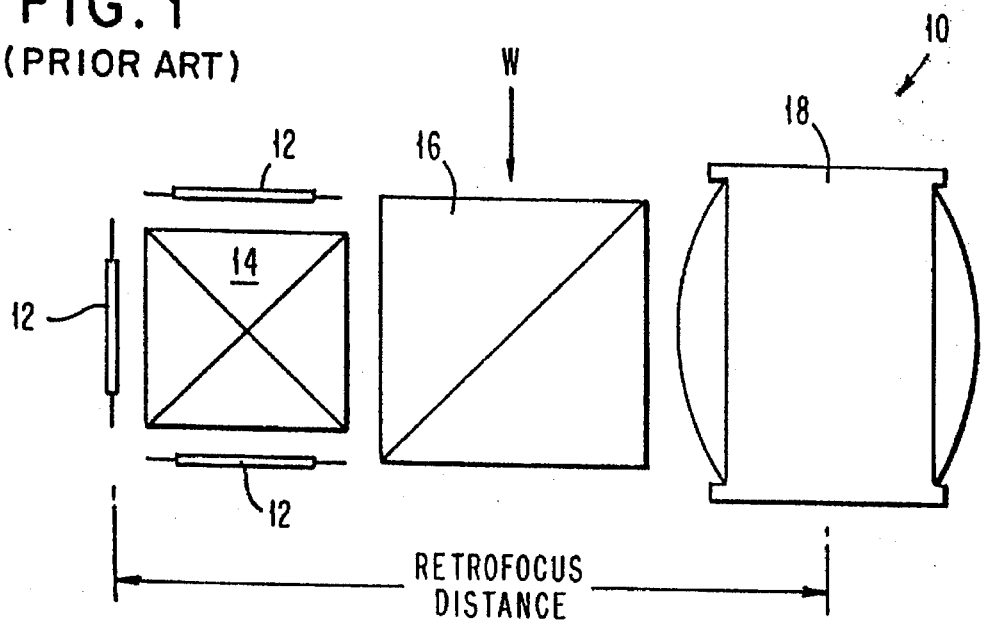
FIG. 1 illustrates a somewhat simplified typical prior art embodiment of a three-light valve projection display system.

Referring to the drawings in detail, FIG. 1 illustrates a somewhat simplified typical prior art embodiment of a three-light valve projection display system 10. The projection display system 10 includes three liquid crystal reflective light valves (spatial light modulators) 12 positioned on three surfaces of a crossed dichroic beam splitter cube 14, a polarizing beam splitter cube 16, and a projection lens 18. White light illumination W is introduced into one face of the polarizing beam splitter cube 16 which passes (reflects) one polarized component thereof into the crossed dichroic beam splitter cube 14. The dichroic beam splitter cube 14 then separates the polarized white light into red, green and blue components.

Each color component is incident upon a liquid crystal reflective light valve 12 which rotates the polarization of the light to produce the required image, in a manner as is known in the art. The three reflected perpendicularly polarized images are then recombined in the dichroic beam splitter cube 14 and pass back through the polarizing beam splitter cube 16 to the projection lens 18. As illustrated at the bottom of FIG. 1, with this prior art approach the projection lens 18 requires a very large working distance (retrofocus distance). Replacing the dichroic beam splitter cube 14 with individual plate beam splitters only increases this long retrofocus distance. This required working distance makes it difficult to design projection lenses with short lens-to-screen distances, such as those required for desk top projection displays.

In the operation of a typical prior art reflective liquid crystal light valve as illustrated in FIG. 1, s-polarized illumination is reflected by the polarizing beam splitter cube 16 and passed through the dichroic beam splitting cube 14 to illuminate the reflective liquid crystal light valves 12. Each pixel of each light valve is selectively driven by a voltage to selectively rotate the polarization of the reflected radiation, such that the original s polarization that is selectively rotated by the light valve to p polarization is passed back through the polarizing beam splitter cube to the projecting optics. Light of the original s polarization is, however, reflected by the polarizing beam splitter cube and discarded. Light in these images returns to the beam splitter as p polarization from bright pixels and as s polarization from dark pixels.

Figure 2:
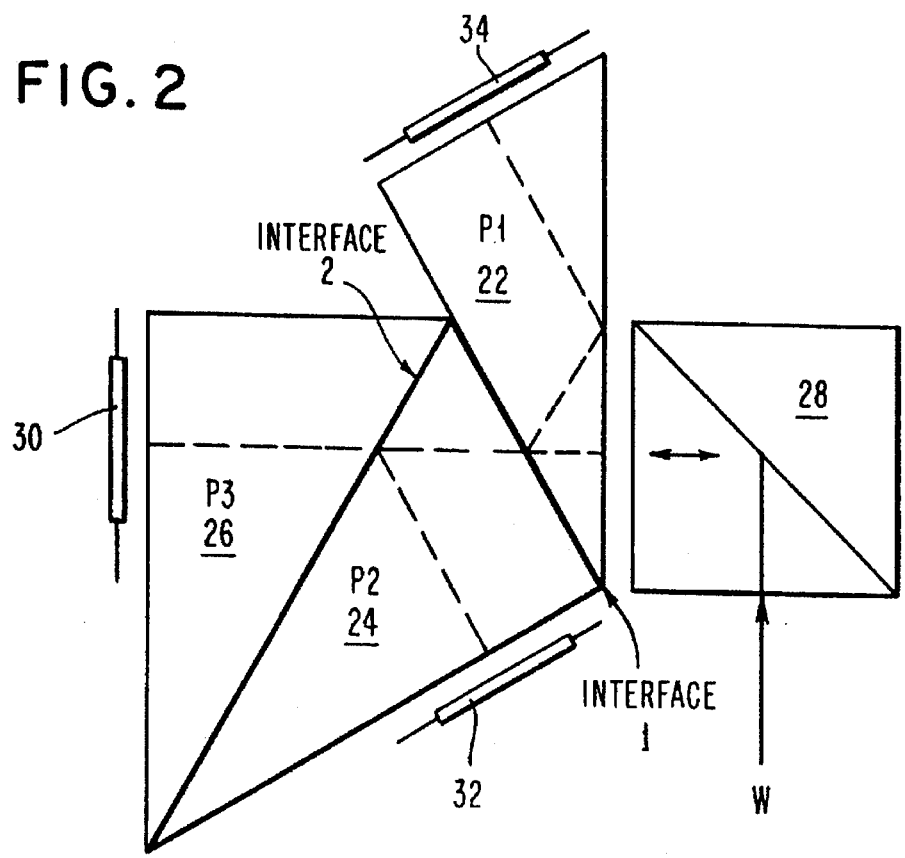
FIG. 2 illustrates an embodiment of a three prism color separator pursuant to the teachings of the present invention wherein one color path does not involve any reflections, a second color path involves one reflection, and a third color path involves two reflections.

The present invention provides a color separation/recombination arrangement for high performance projection displays using three reflective light valves, such as illustrated in FIG. 1. FIG. 2 illustrates a simple optical configuration of the subject invention which is based upon three right angle 30-60-90 prisms 22, 24 and 26 assembled into one unit 20, along with a polarizing cube 28.

The second and third prisms 24, 26 are of identical dimensions. The first prism 22 is a 30-60-90 prism also but is slightly smaller in size. The size of the first prism 22 is determined by the size of the other two prisms according to the following relationship. The hypotenuse of the first prism is equal to the long side of the second and third prisms. These dimensions ensure that the optical path lengths to and from all three light valves 30, 32 and 34 are identical. The three prisms are optically cemented together as illustrated in FIG. 2.

The first and second interfaces 1, 2 between the three prisms contain the multi-layer dielectric optical coatings which provide the color separation. FIG. 2 illustrates one color separation arrangement wherein one color path therein does not involve any reflections, a second color path therein involves one reflection, and a third color path therein involves two reflections. The optical path of green (G) does not involve any reflections, the optical path of blue (B) involves one reflection, and the optical path of red (R) involves two reflections. The discussions herein use this exemplary embodiment although in other embodiments the R, G and B paths can be interchanged using the proper optical dichroic coatings.

As illustrated in FIG. 2, the green light G in the green channel propagates straight through the three-prism assembly to be incident upon the G light valve 30. The blue light B in the blue channel involves a single reflection from the second interface 2. The red light R in the red channel reflects off the first interface 1 at 30 degrees from its normal. The coating on this first interface 1 is a dielectric coating which reflects red light and transmits blue and green light. The red channel then includes a second reflection at 60 degrees from a normal to the surface. This reflection can be either a total internal reflection in the glass or a reflection from an optical coating which transmits red, green and blue light at normal incidence, but reflects red light incident at 60 degrees from normal.

The second interface 2 is between the second and third identical prisms 24, 26 cemented along their hypotenuse as shown in FIG. 2. The optical coating on this second interface 2 reflects the blue light, but transmits the green light. Accordingly, all three colors G, B and R are incident upon their respective light valves 30, 32 and 34, and upon reflection from their respective light valves, the three colors retrace their paths through the three-prism assembly and are recombined to form a color image.

In assembly, each prism is initially coated with a proper color separating dielectric coating as described above, and the three prisms are then assembled and cemented together to form one unit as illustrated in FIG. 2.

While several embodiments and variations of the present invention for a three prism color separator are described in detail herein, it should be apparent that the disclosure and teachings of the present invention will suggest many alternative designs to those skilled in the art.

Having thus described the invention, what is claimed as new and desired to be secured by Letters Patent is:

1. A projection display for projecting a color image in which first, second and third different color component images from first, second and third different reflective light valves are projected onto a display, in which light from a light source containing first, second and third color components passes through an optical beam splitter for directing the beam of light in first, second and third different directions onto first, second and third reflective light valves which reflect the color components back into said optical beam splitter, which combines the reflected color components into one beam for projection of a color image onto the display, wherein said optical beam splitter comprises first, second and third prisms forming a color splitting prism assembly in which the first, second and third prisms are assembled with no air gaps in each of the light paths corresponding to each of the color components between where each of the color components enters said color splitting prism assembly and where each of the color components exits said color splitting prism assembly, and further wherein the first, second and third prisms are dissimilar prisms, with first, second and third optical paths, a first optical path without reflections, a second optical path with one reflection, and a third optical path with two reflections.

2. A projection display as claimed in claim 1, wherein said first prism has a surface which reflects the first color component in a first direction and transmits the second and third color components; said second prism has a surface which reflects the second color component in a second direction and transmits the third color component in a third direction; and wherein said first, second and third prisms are assembled to form the color splitting prism assembly wherein the first, second and third color components do not pass through an air space within said color splitting prism assembly.

3. A projection display as claimed in claim 1, wherein the light source first, second and third color components are red, green and blue.

4. A projection display as claimed in claim 1, wherein the projection display includes a polarizing beam splitter cube for directing light from said light source into said optical beam splitter, and for directing light reflected from the optical beam splitter onto a projection lens for projecting a color image onto a screen.

5. A projection display as claimed in claim 1, wherein said reflective light valves comprise liquid crystal light valves.

6. A projection display as claimed in claim 1, wherein the parity of the image is different in the first, second and third optical paths, with the first and third optical paths having an even number of reflections, and the second optical path having an odd number of reflections.

7. A projection display as claimed in claim 6, wherein the different parity in the second optical path is compensated for electronically by means for electronically reversing each line of scanning in the second optical path.

* * * * *